tion.pdf>.*

US008898090B2

(12) United States Patent
Kapoor et al.

(10) Patent No.: US 8,898,090 B2
(45) Date of Patent: Nov. 25, 2014

(54) INTERACTIVE OPTIMIZATION OF THE BEHAVIOR OF A SYSTEM

(75) Inventors: Ashish Kapoor, Kirkland, WA (US);
Bongshin Lee, Issaquah, WA (US);
Desney S. Tan, Kirkland, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 12/756,183

(22) Filed: Apr. 8, 2010

(65) Prior Publication Data
US 2011/0251980 A1 Oct. 13, 2011

(51) Int. Cl.
*G06F 15/18* (2006.01)
*G06F 7/00* (2006.01)
*G06N 99/00* (2010.01)

(52) U.S. Cl.
CPC ................................. *G06N 99/005* (2013.01)
USPC .............................................. 706/12; 706/20

(58) Field of Classification Search
USPC .......................................................... 706/12
See application file for complete search history.

(56) References Cited

U.S. PATENT DOCUMENTS

| 7,266,492 | B2 | 9/2007 | Goodman |
| 7,617,164 | B2 | 11/2009 | Burges et al. |
| 2003/0220830 | A1 | 11/2003 | Myr |
| 2005/0015323 | A1 | 1/2005 | Myr |

OTHER PUBLICATIONS

Sjöberg (Sjöberg05), Mathematica Neural Networks [online], Sep. 2005 [retrieved on Dec. 26, 2012]. Retrieved from the Internet<URL: http://media.wolfram.com/documents/NeuralNetworksDocumentation.pdf>.*

Mortensen et al. (Mortensen92), Adaptive Boundary Detection Using "Live-Wire" Two-Dimensional Dynamic Programming [online], 1992 [retrieved on Dec. 26, 2012]. Retrieved from the Internet<URL: http://ieeexplore.ieee.org/stamp/stamp.jsp?tp=&arnumber=269378>.*
Pintér et al., Global Optimization Toolbox for Maple: an introduction with illustrative applications [online], 2006 [retrieved on Jul. 8, 2013]. Retrieved from the Internet: <URL:http://ftp.maplesoft.com/company/publications/articles/2006/OMS_06_article_e-print.pdf>.*
Raykar, et al., "Bayesian Multiple Instance Learning: Automatic Feature Selection and Inductive Transfer," retrieved at <<http://www.machinelearning.org/archive/icml2008/papers/587.pdf>>, Proceedings of the Twenty-Fifth International Conference on Machine Learning (ICML 2008), 2008, 8 pages.

(Continued)

*Primary Examiner* — Jeffrey A Gaffin
*Assistant Examiner* — Nathan Brown, Jr.
(74) *Attorney, Agent, or Firm* — Dan Choi; Judy Yee; Micky Minhas

(57) ABSTRACT

An interactive tool is described for modifying the behavior of a system, such as, but not limited to, the behavior of a classification system. The tool uses an interface mechanism to present a current global state of the system. The tool accepts one or more refinements to this global state, e.g., by accepting individual changes to parameter settings that are presented by the interface mechanism. Based on this input, the tool computes and displays the global implications of the updated parameter settings. The process of iterating over one or more cycles of user updates, followed by computation and display of the implications of the attempted refinements, has the effect of advancing the system towards a global state that exhibits desirable behavior.

20 Claims, 11 Drawing Sheets

(56) References Cited

OTHER PUBLICATIONS

Kuncheva, et al., "Adaptive Learning Rate for Online Linear Discriminant Classifiers," retrieved at <<http://www.springerlink.com/content/d7t8130l65378545/fulltext.pdf>>, Lecture Notes in Computer Science, vol. 5342, Proceedings of the 2008 Joint IAPR International Workshop on Structural, Syntactic, and Statistical Pattern Recognition, 2008, pp. 510-519.

Kohavi, et al., "Automatic Parameter Selection by Minimizing Estimated Error," retrieved at <<http://citeseer.ist.psu.edu/cache/papers/cs/124/http:zSzzSzrobotics.stanford.eduzSz~ronnykzSzc45ap.pdf/kohavi95automatic.pdf>>, Proceedings of the Twelfth International Conference on Machine Learning, 1995, 9 pages.

Pavon, et al., "Automatic Parameter Tuning with a Bayesian Case-Based Reasoning System. A Case of Study," retrieved at <<http://www.sciencedirect.com/science?_ob=Mlmg&_imagekey=B6V03-4S08JTH-1-K&_cdi=5635&_user=10&_orig=search&_coverDate=03%2F31%2F2009&_sk=999639997.7997&view=c&wchp=dGLbVzb-zSkzS&_valck=1&md5=2127c9d665d3f88be65acc51f5c081b9&ie=/sdarticle.pdf>>.

Stumpf, et al., "Toward Harnessing User Feedback for Machine Learning," retrieved at <<ftp://ftp.cs.orst.edu/pub/burnett/iui07-mlexplanations.pdf>>, Proceedings of the 12th International Conference on Intelligent User Interfaces, 2007, pp. 82-91.

Kim, et al., "Support Vector Machine Learning for Region-Based Image Retrieval with Relevance Feedback," retrieved at <<http://delivery.acm.org/10.1145/510000/500159/p107-tong.pdf?key1=500159&key2=6918419521&coll=portal&dl=ACM&CFID=64904331&CFTOKEN=14610558>>, ETRI Journal,vol. 29, No. 5, Oct. 2007, pp. 700-702.

Ankerst, et al., "Visual Classification: An Interactive Approach to Decision Tree Construction," retrieved at <<http://www.dbs.informatik.uni-muenchen.de/Publikationen/Papers/Kdd-99.final.pdf>>, Proceedings of the Fifth International Conference on Knowledge Discovery and Data Mining, 1999, 5 pages.

Becker, et al., "Visualizing the Simple Bayesian Classifier," retrieved at <<http://robotics.stanford.edu/~ronnyk/vizNB.ps.gz>>, KDD Workshop on Issues in the Integration of Data Mining and Data Visualization, Aug. 17, 1997, 10 pages.

Caragea, et al., "Gaining Insights into Support Vector Machine Pattern Classifiers Using Projection-Based Tour Methods," retrieved at <<http://www.cs.iastate.edu/~honavar/Papers/caragea-cook-honavar.pdf>>, Proceedings of the Seventh ACM SIGKDD International Conference on Knowledge Discovery and Data Mining, 2001, 6 pages.

Dai, et al., "HMMEditor: A Visual Editing Tool for Profile Hidden Markov Model," Retrieved at <<http://www.ncbi.nlm.nih.gov/pmc/articles/PMC2386073/pdf/1471-2164-9-S1-S8.pdf>>, The 2007 International Conference on Bioinformatics & Computational Biology (BIOCOMP'07), Mar. 20, 2008, 7 pages.

Drummond, et al., "Cost Curves: An Improved Method for Visualizing Classifier Performance," retrieved at <<http://www.springerlink.com/content/628v6224835730k8/fulltext.pdf>>, Machine Learning, vol. 65, No. 1, Oct. 2006, pp. 95-130.

Evgeniou, et al., "Leave One Out Error, Stability, and Generalization of Voting Combinations of Classifiers," retrieved at <<http://www.springerlink.com/content/g5851t65h5577r7l/fulltext.pdf>>, Machine Learning, vol. 55, No. 1, Apr. 2004, pp. 71-97.

Fails, et al., "Interactive Machine Learning," retrieved at <<http://www.cs.umd.edu/hcil/fails/publications/IUI2003-Interactive-Machine-Learning.pdf>>, Proceedings of the 8th International Conference on Intelligent User Interfaces, 2003, 8 pages.

Fei-Fei, et al., "One-Shot Learning of Object Categories," retrieved at <<http://ieeexplore.ieee.org/stamp/stamp.jsp?arnumber=01597116>>, IEEE Transactions on Pattern Analysis and Machine Intelligence, vol. 28, No. 4, Apr. 2006, pp. 594-611.

Fogarty, et al., "Examining Task Engagement in Sensor-Based Statistical Models of Human Interruptibility," retrieved at <<http://portal.acm.org/ft_gateway.cfm?id=1055018&type=pdf&coll=GUIDE&dl=GUIDE&CFID=63029833&CFTOKEN=96704345>>, Proceedings of the SIGCHI conference on Human factors in Computing Systems, 2005, pp. 331-340.

Frank, et al., "Visualizing Class Probability Estimators," retrieved at <<http://www.springerlink.com/content/7m0rb0u7q5rq7x9g/fulltext.pdf>>, Lecture Notes in Artificial Intelligence, vol. 2838, 2003, pp. 168-179.

Garner, Stephen R., "WEKA: The Waikato Environment for Knowledge Analysis," retrieved at <<http://www.cs.waikato.ac.nz/~ml/publications/1995/Garner95-WEKA.pdf>>, Proceedings of the New Zealand Computer Science Research Students Conference, 1995, 8 pages.

Grimes, et al., "Feasibility and Pragmatics of Classifying Working Memory Load with an Electroencephalograph," retrieved at <<http://www.cs.washington.edu/homes/rao/chi-08.pdf>>, Proceeding of the Twenty-Sixth Snnual SIGCHI Conference on Human Factors in Computing Systems, 2008, pp. 835-844.

Horvitz, et al., "Learning and Reasoning about Interruption," retrieved at <<http://research.microsoft.com/en-us/um/people/horvitz/iw.pdf>>, International Conference on Multimodal Interfaces, Proceedings of the 5th International Conference on Multimodal Interfaces, Nov. 2003, 9 pages.

Kapoor, et al., "Experience Sampling for Building Predictive User Models: A Comparative Study," retrieved at <<http://portal.acm.org/ft_gateway.cfm?id=1357159&type=pdf&coll=GUIDE&dl=GUIDE&CFID=63033725&CFTOKEN=71019926 >>, Proceeding of the Twenty-sixth Annual SIGCHI Conference on Human Factors in Computing Systems, Apr. 2008, pp. 657-666.

Patel, et al., "Examining Difficulties Software Developers Encounter in the Adoption of Statistical Machine Learning," retrieved at <<http://www.cs.washington.edu/homes/jfogarty/publications/aaai2008-adoption.pdf>>, Proceedings of the 23rd National Conference on Artificial intelligence, 2008, 4 page.

Platt, John C., "Probabilstic Outputs for Support Vector Machines and Comparisons to Regularized Likelihood Methods," retrieved at <<http://citeseerx.ist.psu.edu/viewdoc/download?doi=10.1.1.41.1639&rep=rep1&type=pdf>>, Advances in Large Margin Classifiers, 1999, pp. 1-11.

Rheingans, et al., "Visualizing High-Dimensional Predictive Model Quality," retrieved at <<http://www.cs.umbc.edu/~rheingan/pubs/vbma00.pdf>>, Proceedings of the 11th IEEE Visualization 2000 Conference (VIS 2000), Oct. 2000, 5 pages.

Saponas, et al., "Demonstrating the Feasibility of Using Forearm Electromyography for Muscle-Computer Interaces"retrieved at <<http://reseach.microsoft.com/en-us/um/redmond/groups/cue/publictions/CHI2008-EMG.pdf>>, Proceeding of the Twenty-sixth Annual SIGCHI Conference on Human Factors in Computing Systems, Apr. 2008, 10 pages.

Stiglic, et al., "Using Visual Interpretation of Small Ensembles in Microarray Analysis," retrieved at <<http://ieeexplore.ieee.org/stamp/stamp.jsp?arnumber=01647651>>, Proceedings of the 19th IEEE Symposium on Computer-Based Medical Systems, Jun. 2006, 5 pages.

Talbot, et al., "EnsembleMatrix: Interactive Visualization to Support Machine Learning with Multiple Classifiers," retrieved at <<http://research.microsoft.com/en-us/um/redmond/groups/cue/publications/chi2009-ensemblematrix.pdf>>, Proceedings of the 27th International Conference on Human factors in Computing Systems, Apr. 2009, 10 pages.

Urbanek, Simon., "Exploring Statisical Forests," retrieved at <<http://simon.urbanek.info/research/pub/urbanek-jsm02.pdf>>, In Proc. of the 2002 Joint Statistical Meeting (2002), 6 pages.

Ware, et al., "Interactive Machine Learning: Letting Users Build Classifiers," retrieved at <<http://www.cs.waikato.ac.nz/~eibe/pubs/Ware_et_al_IJHCS.pdf>>, International Journal of Human-Computer Studies, vol. 56, No. 3, Sep. 2002, pp. 1-12.

Cover, et al., Elements of Information Theory, 2nd Edition, Wiley-Interscience, 2006, Amazon.com product page, retrieved at <<http://www.amazon.com>>, retrieved on Apr. 7, 2010, 10 pages.

Duda, et al., "Pattern Classification," 2nd Edition, Wiley, 2001, Amazon.com product page, retrieved at <<http://www.amazon.com>>, retrieved on Apr. 7, 2010, 8 pages.

Picard, Rosalind W., "Affective Computing," MIT Press, 2000, Amazon.com product page, retrieved at <<http://www.amazon.com>>, retrieved on Apr. 7, 2010, 8 pages.

* cited by examiner

|  | PREDICTED CLASSES | | | |
|---|---|---|---|---|
|  | RAIN | CLOUDY | SUNNY | ACTUAL CLASSES |
|  | (350) | (13) | (12) | RAIN |
|  | (5) | (205) | 16 | CLOUDY |
|  | (11) | (16) | (198) | SUNNY |

FIG. 5

|  | PREDICTED CLASSES | | | |
|---|---|---|---|---|
|  | RAIN | CLOUDY | SUNNY | ACTUAL CLASSES |
|  | 350 | 13 | 12 | RAIN |
|  | 5 — 604 | 205 | 16 — 602 | CLOUDY |
|  | 11 | 16 | 198 | SUNNY |

606 — CLEAR BIASING

FIG. 6

|  | PREDICTED CLASSES | | | |
|---|---|---|---|---|
| | RAIN | CLOUDY | SUNNY | ACTUAL CLASSES |
| | 339 | 29 | 7 | RAIN |
| | 4  604 | 214 | 8 | CLOUDY |
| | 9 | 28 | 188 | SUNNY |

|  | PREDICTED CLASSES | | | |
|---|---|---|---|---|
| | RAIN | CLOUDY | SUNNY | ACTUAL CLASSES |
| 802 UNDO | 343 | 18 | 14 | RAIN |
| 804 REDO | 4 | 206 | 16 | CLOUDY |
| | 8 | 16 | 201 | SUNNY | int
INTERACTIVE OPTIMIZATION OF THE BEHAVIOR OF A SYSTEM

BACKGROUND

A system that performs analysis, such as a classification system, may exhibit behavior that a user deems unsatisfactory for one or more reasons. In response, the user may attempt to modify various aspects of the system to improve its performance. Commonly, a user performs this task in an iterative and ad hoc manner. For instance, the user may change the value of an individual parameter of the system, observe the resultant performance of the system, and then make another change to the same parameter or another parameter, etc.

The above approach to modifying the behavior of a system is not fully satisfactory. First, the behavior of the system may be difficult to understand, even for users who are considered experts in the field to which the system pertains. For instance, the behavior of the system may depend on the configuration of numerous parameters. Further, there may be complex dependencies among various parameters. Thus, the user may have difficulty in determining: a) what parameters are good candidates to change; and b) how these parameters can be changed to achieve a desired effect. Second, the ad hoc approach to modifying the behavior of the system may pose a combinatorial space of design decisions; thus, this approach may be tedious and prone to error, generally providing poor user experience and user controls. These drawbacks are merely representative; existing techniques for modifying the behavior of systems may suffer from yet other potential shortcomings.

SUMMARY

A tool is described that performs mathematical analysis; that analysis, in turn, may be used to perform various actions, such as the classification of objects or entities into predefined classes. In operation, the tool provides a presentation using an interface mechanism. The presentation includes a plurality of parameter settings that collectively provides a manipulatable visualization of a current global state of the system. The tool then receives, via the interface mechanism, input from a user that affects at least one of the parameter settings. The tool then determines changes in at least one modifiable feature of the system based on the input from the user, providing that the changes are feasible. The tool then applies the changes to the system to produce a new current global state. The new current global state reflects the global implications of the user's input (meaning the overall effect that the input has on the system). The tool then provides an updated presentation that provides a manipulatable visualization of the new current global state, the updated presentation providing feedback to the user regarding an effect of the input, thus facilitating real time interaction.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4-8 show various illustrative graphical user interface presentations through which the user may convey the desired behavior of a classification system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The disclosure is organized as follows. Section A describes an illustrative tool for modifying the behavior of a system. Section B describes illustrative methods which explain the operation of the tool of Section A. Section C describes illustrative processing functionality that can be used to implement any aspect of the features described in Sections A and B.

According to one illustrative implementation, the tool provides an interactive mechanism with user controls that couples cycles of analyses and visualizations, allowing the user to explore and refine the operation of the system. As a whole, the tool implements a human-in-the-loop method of modifying the behavior of the system. That is, the user and tool work together to iteratively bring about desired behavior in the system. The user guides the modification in some respects by providing updates to a set of parameter settings. The tool automatically computes and displays the global implications of these updates. The process of iterating over one or more cycles of user updates, followed by computation and display of the implications of the attempted refinements, has the effect of advancing the system towards a global state that exhibits desirable behavior.

From the perspective of the user, the tool steers the system towards desired goals in a user-friendly and efficient manner. This is because the tool provides an interface mechanism which is easy to understand and use, e.g., by communicating with the user in the context of the output of the system, rather than underlying system parameters on which the output depends. Further, the tool provides feedback in a sufficiently timely manner to facilitate real time interaction and "what-if" simulation analysis.

The tool can be applied to various types of physical systems that perform mathematical analysis (where the term "mathematical analysis" encompasses logical analysis). Without limitation, for instance, the tool can be applied to modify the behavior of any type of classification system. For example, the interface mechanism can display a confusion matrix (or other data structure) that provides current classification results. The user can specify changes to the confusion matrix via the interface mechanism. In response, the tool can make changes to an underlying cost matrix, where the cost matrix expresses classification preferences. These changes produce an updated current state, leading to a new confusion matrix. The tool can achieve these results by optimizing an objective function.

Figure 13:
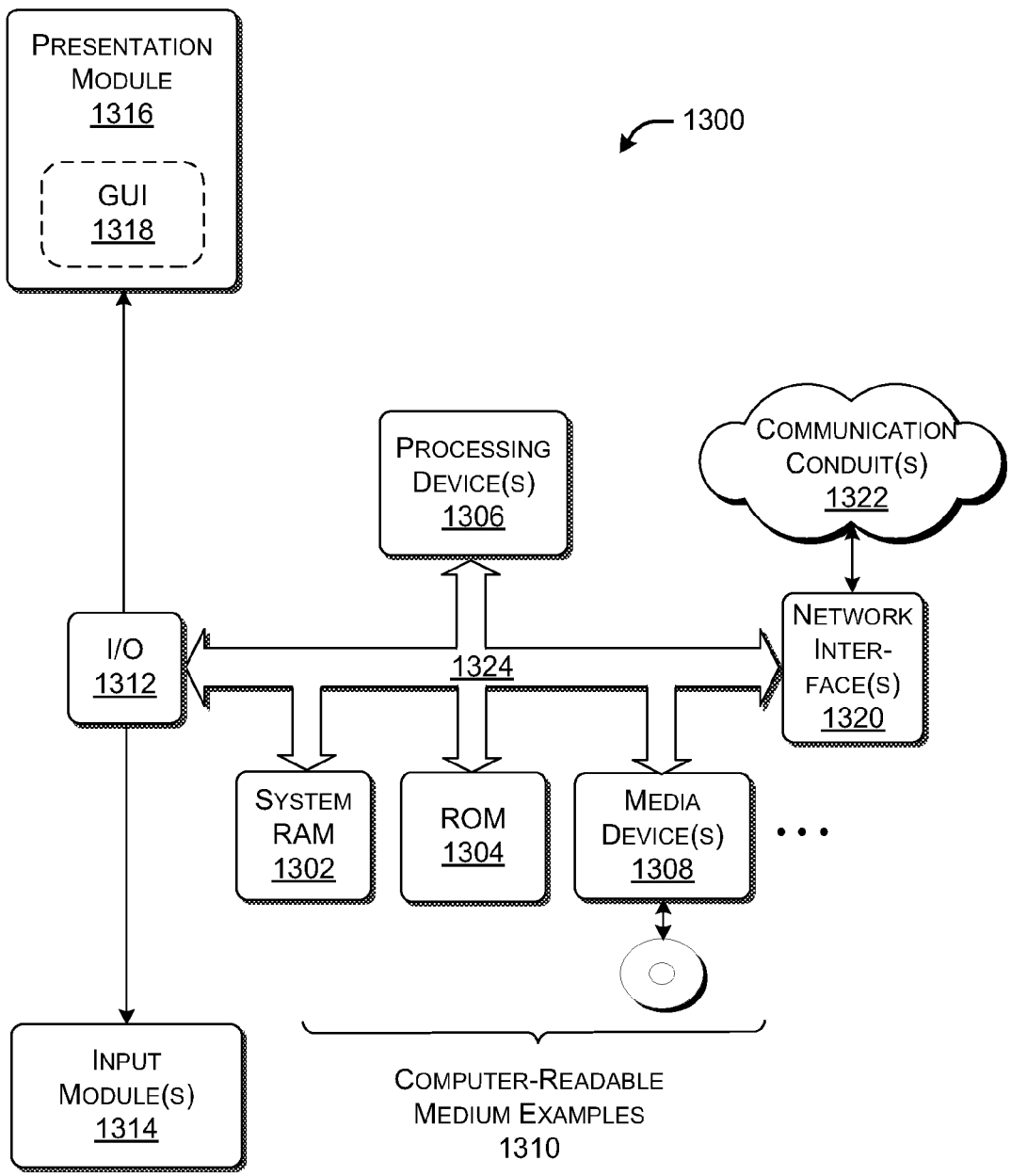
FIG. 13 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, such as by hardware, software-implemented electrical components, and/or some combination thereof. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 13, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system (e.g., "computing functionality"), a logic component represents a physical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Systems

A.1. Overview of an Illustrative Tool

Figure 1:
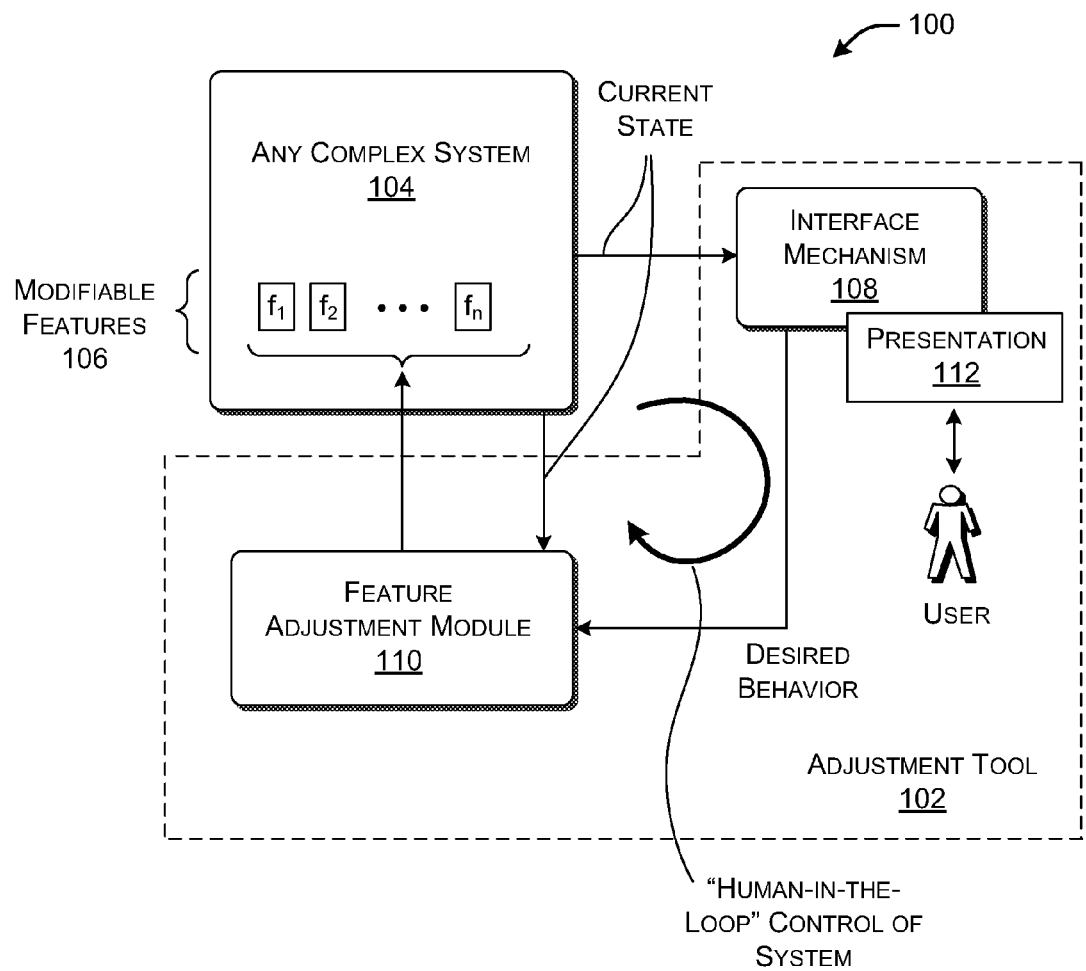
FIG. 1 shows an illustrative environment in which a tool is used to change the behavior of any system using a "human-in-the-loop" methodology.

FIG. 1 shows an illustrative environment 100 in which an adjustment tool 102 (just "tool" for brevity below) can be used to modify the behavior of any physical system 104 that performs mathematical analysis. The system 104 may correspond to any functionality for receiving an input, performing processing on the input using electrical processing equipment, and producing an output which reflects an outcome of the processing. Section A.2 presents an instantiation of the system 104 in the form of a classification system. After being trained, the classification system described in Section A.2 determines the probabilities that an unknown data item corresponds to respective possible classes.

In general, the system 104 includes modifiable features 106. The modifiable features 106 refer to characteristics of the system 104 that can be changed by the tool 102 to influence the behavior of the system 104. For example, the modifiable features 106 for a classification system refer to underlying controlling variables and settings that influence the manner in which the classification system operates. The modifiable features 106 may represent a subset of constraints that have a bearing on the operation of the system 104.

The tool 102 can include (or can be conceptualized to include) two main components: an interface mechanism 108 and a feature adjustment module 110. The interface mechanism 108 provides a presentation 112 to a user which reflects a current state of the system 104. The interface mechanism 108 can describe the current state using a plurality of parameter settings. For example, in the context of a classification system, the interface mechanism 108 can provide a plurality of classification results in the form of a confusion matrix (or other form), where these results constitute parameter settings. Again, Section A.2 will provide additional information regarding the role of the interface mechanism 108 in the context of a classification system.

The presentation 112 can include any functionality for conveying the current state to the user. In one case, the presentation 112 corresponds to a graphical user interface (GUI) presentation which displays the plurality of parameter settings in graphic form. Alternatively, or in addition, the presentation 112 can provide audio output which conveys the current state. Alternatively, or in addition, the presentation 112 can provide a three-dimensional model which conveys the current state (e.g., by modulating its shape based on the shape). Still other implementations are possible.

The interface mechanism 108 also includes functionality for receiving input from the user. Namely, the user may conclude that the current state of the system 104 does not satisfy one or more performance objectives. In response, the user may enter instructions via the interface mechanism 108 which convey a desired behavior of the system 104. The interface mechanism 108 can perform this task in different ways. For example, the interface mechanism 108 can provide one or more control features on a GUI presentation through which the user may enter instructions. Alternatively, or in addition, the interface mechanism 108 can provide a voice recognition mechanism to receive a spoken instruction from the user. Alternatively, or in addition, the interface mechanism 108 can receive a tactile instruction from the user. For example, the interface mechanism can present a three-dimensional model which reflects the current state of the system. The user can physically manipulate the shape to convey the desired behavior of the system. Still other implementations are possible.

The feature adjustment module 110 receives input which indicates the current state of the system 104 and the desired behavior of the system (as conveyed by the user's input received via the interface mechanism 108). In response, the feature adjustment module 110 makes changes to one or more of the modifiable features 106 of the system 104. The changes have the effect of moving the system 104 from the current state towards the desired state. By way of overview, first, the feature adjustment module 110 can characterize the discrepancy between the current state of the system 104 and the desired behavior, with respect to the modifiable feature 106. Second, the feature adjustment module 110 can determine an appropriate manner in which to change the modifiable features 106. Third, the feature adjustment module 110 can apply the identified changes to the system 104. Sections A and B will explain these operations in greater detail in the context of a classification system.

In one implementation, the feature adjustment module 110 operates by determining a plurality of current state items o (e.g., vectors) which characterize the current state of the system 104 and a plurality of target state items t (e.g., vectors) which characterize the target state of the system (associated with the desired behavior). These different state items correspond to different respective data items. The feature adjustment module 110 then determines a model which characterizes a manner of change in the system 104, such as an objective function which characterizes differences between the current state items and the target state items. Then the feature adjustment module 110 uses a gradient ascent methodology to determine gradients of the objective function, with respect to the respective modifiable features 106. The gradients, together with step size parameters, determine the manner in which the modifiable features 106 can be changed to produce the desired behavior.

After the system 104 implements the changes, it produces an updated current state. For example, a classification system will yield new classification results as a result of the changes that have been made to its underling controlling variables or settings. The interface mechanism 108 presents information which conveys the new current state for perusal by the user. The user may then determine whether the changes were successful in achieving the desired behavior. In many cases, the user will conclude that the changes have moved the system 104 in a desired direction, but the system 104 is not yet exhibiting completely satisfactory performance. If so, the user may opt to enter additional instructions via the interface mechanism 108, upon which the feature adjustment module 110 determines and applies a new round of adjustments to the modifiable features 106.

Considered in its entirety, the tool 102 implements a human-in-the-loop method of controlling the behavior of the system 104. Through this process, the user provides guidance by entering his or her preferences via the interface mechanism 108. The feature adjustment module 110 then makes underlying changes to the system 104 that are based on the user's input and other constraints to which the system 104 is subject. The tool 102 provides good user experience because the presentation 112 is easy to understand by the user, e.g., because the user can specify his or her preferences in the context of the output of the system 104, rather than the system's underlying controlling variables (which may not be fully understood by the user). In other words, the tool 102 shields the complexity of the underlying changes from the user, yet provide a way for the user to influence these changes. Further, the tool 102 provides feedback in a sufficiently timely manner to facilitate real time interaction with the user.

In one case, the tool 102 and/or the system 104 can be implemented by one or more computing devices, or, more generally, by any type of physical computing functionality. For example, the tool 102 and system 104 can be implemented by two components within a single computing device or by two respective computing devices. Illustrative computing devices include a desktop computing device, a laptop computing device, a personal digital assistant (PDA) type computing device, a stylus-type computing device, a mobile phone type computing device, a game console device, a set-top box device, and so on. Generally, the tool 102 can be local or remote with respect to the system 104. Further, the user can be local or remote with respect to the tool 102 and/or the system 104. If included, the communication link(s) which couple the tool 102, system 104, and user can be implemented in any manner, such as direct link(s), local area network(s) of any type, wide area network(s) of any type, and so on. Generally, Section C below provides additional details regarding one illustrative application of the features described herein.

A.2. Application of the Tool to Controlling a Classification System

Figure 2:
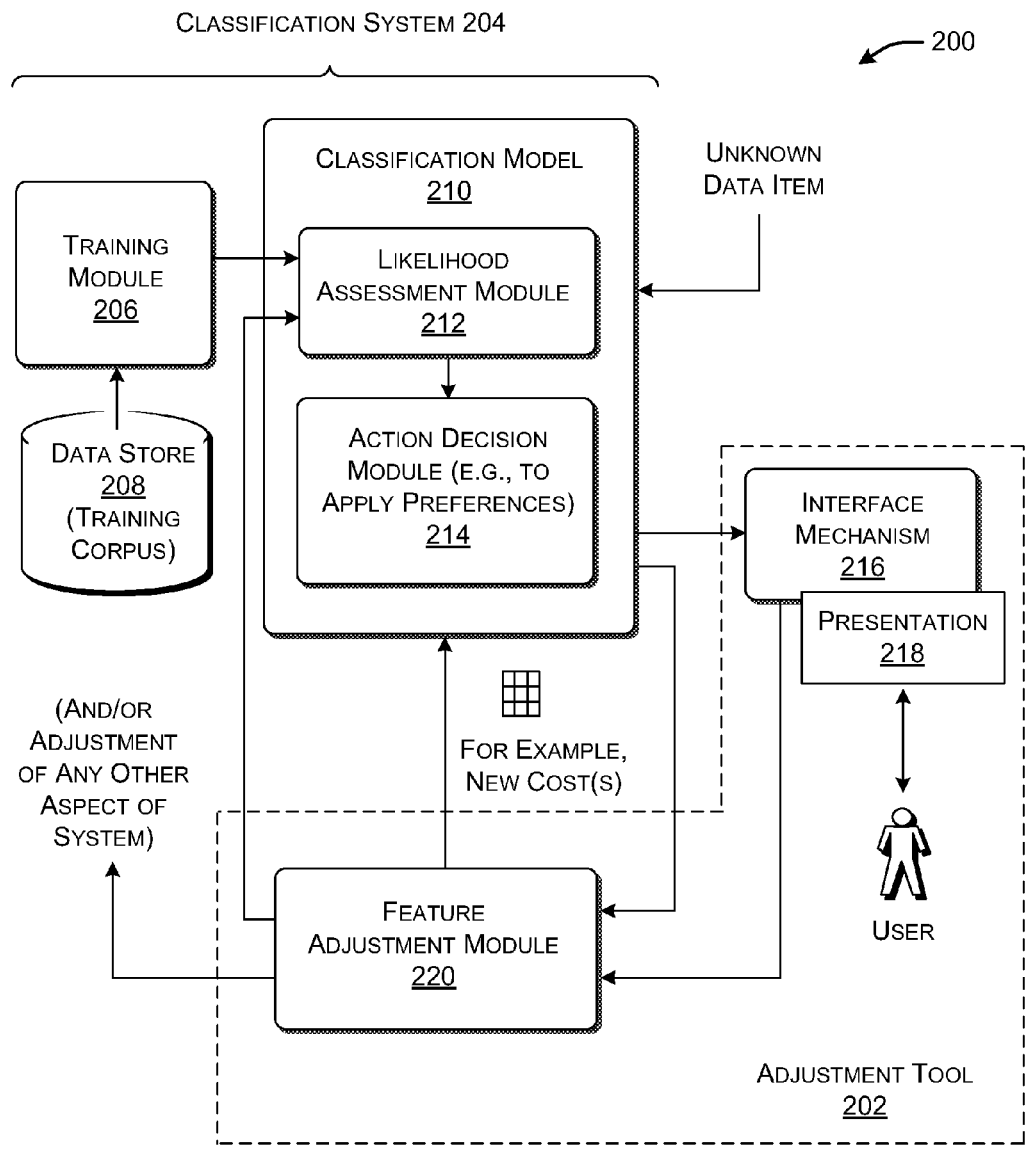
FIG. 2 shows a more specific illustrative environment in which the tool is used to change the behavior of a classification system.
Figure 3:
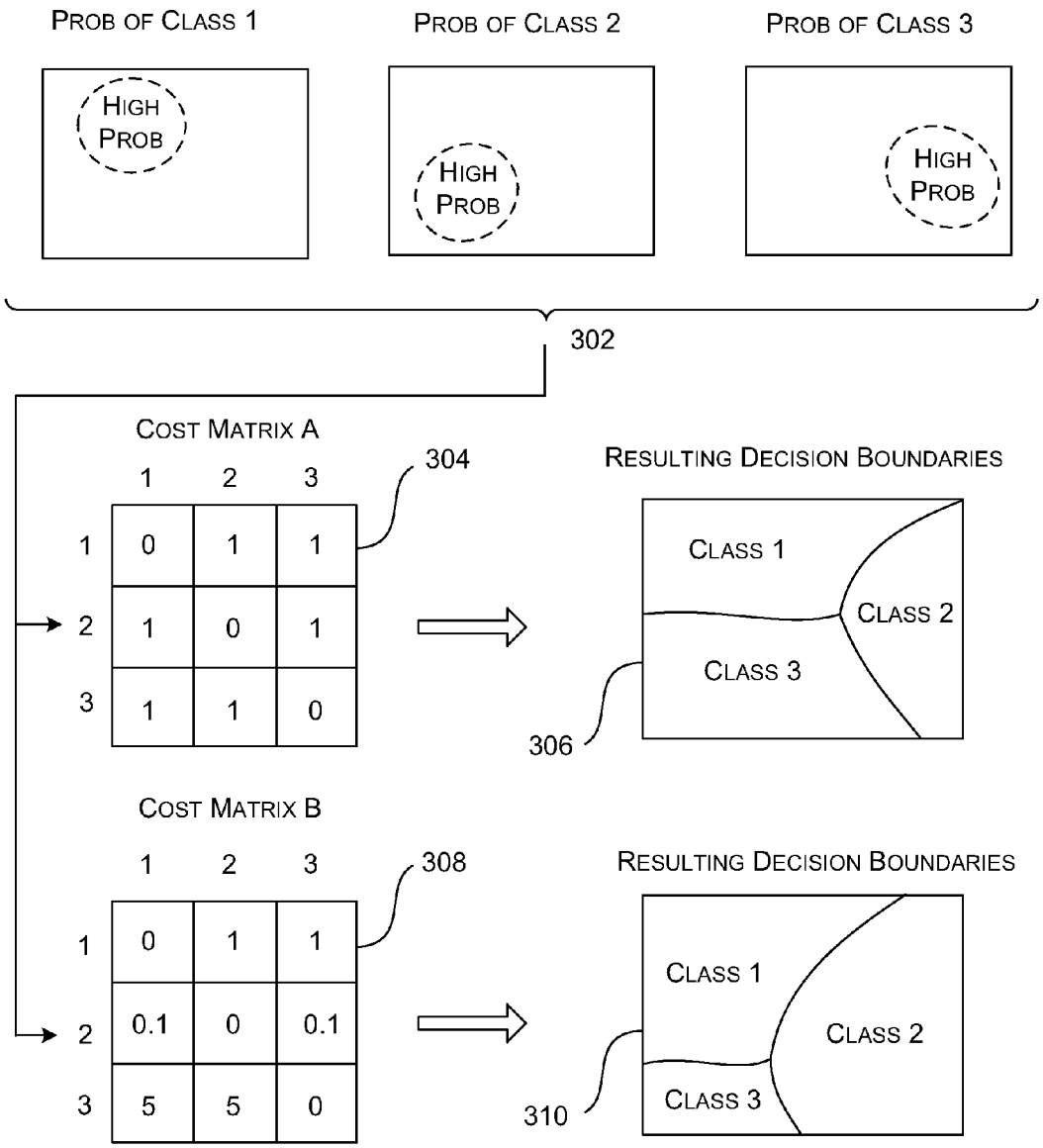
FIG. 3 shows the illustrative effects that two cost matrices have on decision boundaries of a classification system.

FIG. 2 shows one environment 200 in which a tool 202 can be used to adjust the behavior of a classification system 204. This is one instantiation of the principles set forth in FIG. 1. Note that the principles of this disclosure can be applied to other types of classification systems (compared to that shown in FIG. 2), as well as other types of systems.

The classification system 204 can be applied to any classification task. To cite one example, the classification system 204 can be applied in the field of human-computer interaction (HCI). For example, the classification system 204 can be used to disambiguate and interpret noisy streams of data supplied by a computer interface, such as data derived from handwriting input, speech recognition input, vision-based input, muscle input, and so on. In this role, the classification system 204 can detect implicit states associated with a user's interaction with a computer. To repeat, this is just one possible field of application of the classification system 204.

The classification system 204 includes a training module 206 that operates on a training corpus provided in a data store 208 to produce a classification model 210. More specifically, the training corpus includes a plurality of data items. Each data item includes one or more attributes and an associated assessment. For each data item, the assessment identifies a correct classification of the data item's attributes. For example, assume that the classification system 204 is applied to the task of diagnosing patient illnesses based on patient symptoms. Each data item includes a set of symptoms associated with a patient's illness, together with a conclusion as to the correct disease (or diseases) associated with the symptoms. The training module 206 processes the training corpus to produce the classification model 210. The classification model 210 captures the "knowledge" extracted from the training corpus.

The training module 206 can apply various techniques to improve the robustness in its analysis. For example, the training module 206 can apply the known "leave-one-out" approach to avoid over-fitting. Over-fitting occurs when a classification model represents a good "fit" for a particular training corpus, but does not extend well to unknown data items. The leave-one-out approach classifies each data item based on a model that is produced by omitting that data item from the training corpus. This procedure yields results which are statistically robust.

After the training phase, the classification model 210 can be used to process unknown data items. A data item is unknown in the sense that it provides a set of attributes (such as symptoms) without an existing assessment (such as a diagnosis) of those attributes. The classification model 210 operates on the attributes to provide the assessment.

In one implementation, the classification model 210 can provide two phases of analysis using a likelihood assessment module 212 and an action decision module 214 ("decision module" for brevity below). The likelihood assessment module 212 determines the probabilities that a data item corresponds to a plurality of possible classes. More formally, the likelihood assessment module 212 computes the probability $p_i$ that the data item corresponds to a class i, with respect to a plurality of possible classes, e.g., i=1 to c. The decision module 214 determines and takes any type of action based on, inter alia, the probabilities provided by the likelihood assessment module 212.

For example, again assume that the classification system 204 is directed to the classification of symptoms, in which case the unknown data item identifies the symptoms of a particular patient. The likelihood assessment module 212 assesses the probabilities that the symptoms describe different types of possible diseases. The decision module 214 takes action based on the probabilities. According to one action, the decision module 214 provides a final classification of the disease based on the probabilities. For example, the decision module 214 can provide a conclusion that a patient's symptoms represent a benign pigmentation of the skin, rather than melanoma. (In this example, the classification model 210 operates based on a single-hypothesis mode of operation. However, the classification model 210 can also operate based on a multiple-hypothesis mode of operation, e.g., where the classification model 210 can also determine whether two or more diseases may be present at the same time. In the multi-hypothesis mode, the term "class" may pertain to a combination of different conclusions.)

In one case, the training module 206 uses machine learning techniques to produce a statistical classification model 210. In another case, the classification model 210 can be implemented as a logic-based expert system, a neural network, etc. No limitation is placed on the technology used to implement the classification model 210.

In one implementation, the decision module 214 applies cost values which influence the classification performed by the classification system 204. For example, a doctor may deem that it is less important to misdiagnose benign pigmentation as skin cancer than to miss an early opportunity to treat a serious skin malignancy. Accordingly, the doctor can attach a greater cost value to the misdiagnosis of cancer as benign pigmentation compared to the misdiagnosis of the benign pigmentation as cancer (this being one merely illustrative example).

In one illustrative example, the decision module 214 can organize the cost values in a data structure. One such data structure is a two-dimensional cost matrix. In such a matrix, a cost value $cost_{ij}$ represents the cost of misclassifying a data item as class j when its actual classification is class i. Hence, the row dimension (i) of the cost matrix represents actual class, and the column dimension (j) of the cost matrix represents the current class assigned by the classification model 210. Other implementations can use other types of data structures to represent cost values. For example, in other cases, the data structure can organize cost values using a graph, or a tree, or a table, etc. Further, in any implementation, the data structure can have more than two dimensions.

The decision module 214 uses the cost matrix to classify a data item, in conjunction with the probabilities provided by the likelihood assessment module 212 for that data item. For example, the decision module 214 can calculate the risk (risk) of assigning the data item to each possible class j as follows:

$$risk^j = \sum_{i=1}^{c} p_i \cdot cost_{ij}.$$

Here, $p_i$ is a likelihood that the data item corresponds to class i, c is the total number of possible classes, and $cost_{ij}$ represents the cost of assigning the data item to class j if the data item's true class is i. After computing the risks for different classes, the decision module 214 can then assign the data item to the class that has the minimum risk.

It can be seen that the cost matrix has the effect of adjusting the boundaries used by the classification model 210 to assign data items to respective classes. For example, jumping ahead momentarily to FIG. 3, consider the case in which the classification system 204 is configured to assign a data item to three possible classes. The top row 302 illustrates hypothetical probabilities for the three classes over a two-dimensional space. These illustrative probabilities are produced by a classification model that is built using some hypothetical training corpus. A first cost matrix 304 assigns values of zero to the diagonal cells in the matrix, and cost values of one to off-diagonal elements. This means that the first cost matrix 304 assigns no cost penalty to the correct classification of a data item (e.g., where i=j), and assigns the same penalty to all misclassification possibilities (e.g., where i≠j). A two-dimensional space 306 illustrates the resultant decision boundaries produced by combining the probabilities in the top row 302 with the first cost matrix 304.

A second cost matrix 308 modifies the first cost matrix by: (a) increasing the cost of improperly classifying class 3 as class 1 (e.g., as reflected by the change of cost value $cost_{31}$ from 1 to 5); (b) increasing the cost of improperly classifying class 3 as class 2; (c) decreasing the cost of improperly classifying class 2 as class 1; and (d) decreasing the cost of improperly classifying class 2 as class 3. A two-dimensional space 310 represents the effect of these changes on the decision boundaries. Note, for instance, that the classification system 204 is now less likely to assign the data item to class 3, and more likely to assign the data item to class 2.

Indeed, by setting a high value of $cost_{ij}$, it is possible to obtain decision boundaries that avoid assigning a data item to a class j, when its true class is i, unless the classification model assigns a high likelihood to class j. Similarly, by setting a low $cost_{ij}$, it is possible to bias the classification of a data item to class j even though the classification model assigns a relatively low likelihood to this class.

Returning to FIG. 2, the classification system 204 can use a cost matrix to assign classes to a collection of N data items in a test set. Each test data item is like a training data item in that it includes a collection of attributes (such as symptoms) and an assessment of those attributes (such as a diagnosis). (In one case, the same data set can be used for training and testing, e.g., using the leave-one-out methodology, whereby each particular test data item is processed using a model that is created by a training corpus which omits that particular data item.) In many cases, the classification system 204 will produce the correct classification of a test data item, such that class i (the true class) equals class j (the class assessed by the classification system 204). In other cases, the classification system 204 will produce an incorrect classification. Test data items are referred to as just "data items" below for brevity.

More generally, the classification system 204 produces classification results for the test set to indicate the classes assigned to its data items, together with an indication of whether or not these classes are correct. Considered as a whole, the classification results reflect the current state of the classification system 204 insofar as they reflect the current behavior of the classification system 204.

An interface mechanism 216 can convey the current state of the classification system 204 using a presentation 218. As stated in Section A.1., the presentation 218 can take any form, such as a GUI presentation, an audio presentation, a three-dimensional model, etc., or any combination thereof. As explained, the presentation 218 presents a plurality of parameter settings that describe the current state. For example, in one case, the interface mechanism 216 conveys the current state as a confusion matrix. The confusion matrix parallels the organization of the cost matrix, such that the row dimension (i) of the confusion matrix identifies the correct class while the column dimension (j) identifies the assessed class. A value in any cell of the confusion matrix indicates the number of data items that have been classified into a particular class, either correctly (for diagonal elements) or incorrectly (for off-diagonal elements). These values constitute parameter settings. FIGS. 4-8, described below, show examples of one type confusion matrix. However, this type of data structure is merely representative. Other implementations can provide data structures that use additional dimensions and/or use other ways of organizing classification results.

The user can examine the confusion matrix provided by the presentation 218. The user can conclude that the current behavior of the classification system 204 (as reflected by the classification results) does not match the preferred behavior. If so, the user can interact with the interface mechanism 216 to make changes to individual parameter settings in the confusion matrix. FIGS. 4-8 will describe different ways that the user can make such changes.

A feature adjustment module 220 receives an indication of the current state of the classification system 204, which reflects the current classification results produced by the classification system 204. The feature adjustment module 220 also receives the desired behavior of the classification system 204, which reflects the changes that the user has made via the interface mechanism 216. In response, the feature adjustment module 220 can make changes (if feasible) to one or more modifiable features of the classification system 204. For example, the feature adjustment module 220 can makes various changes to the cost values in the cost matrix (the cost values in this example constituting the modifiable features). Section B describes one way that the feature adjustment module 220 can perform this task.

The tool 202 can alternatively, or in addition, modify other aspects of the classification system 204 to bring about a desired change in performance. For instance, the feature adjustment module 220 can make changes to the way that the likelihood assessment module 212 assigns probabilities to data items. In addition, or alternatively, the feature adjustment module 220 can invoke changes in a way that the training module 206 operates on the training corpus to produce the classification model 210. For example, the feature adjustment module 220 can reach a conclusion that it is appropriate to include more data items that are correctly classified into a particular class (e.g., more data items associated with a melanoma diagnosis). Alternatively, or in addition, the feature adjustment module 220 can reach a conclusion that it is appropriate that the training module 206 derive multiple classification models to handle different respective sub-classification tasks, instead of a single classification model. Such multiple classification models can be configured to operate in parallel, series, or a combination thereof. These examples are representative rather than exhaustive; the feature adjustment module 220 can modify the classification system 204 in yet other ways.

Figure 4:
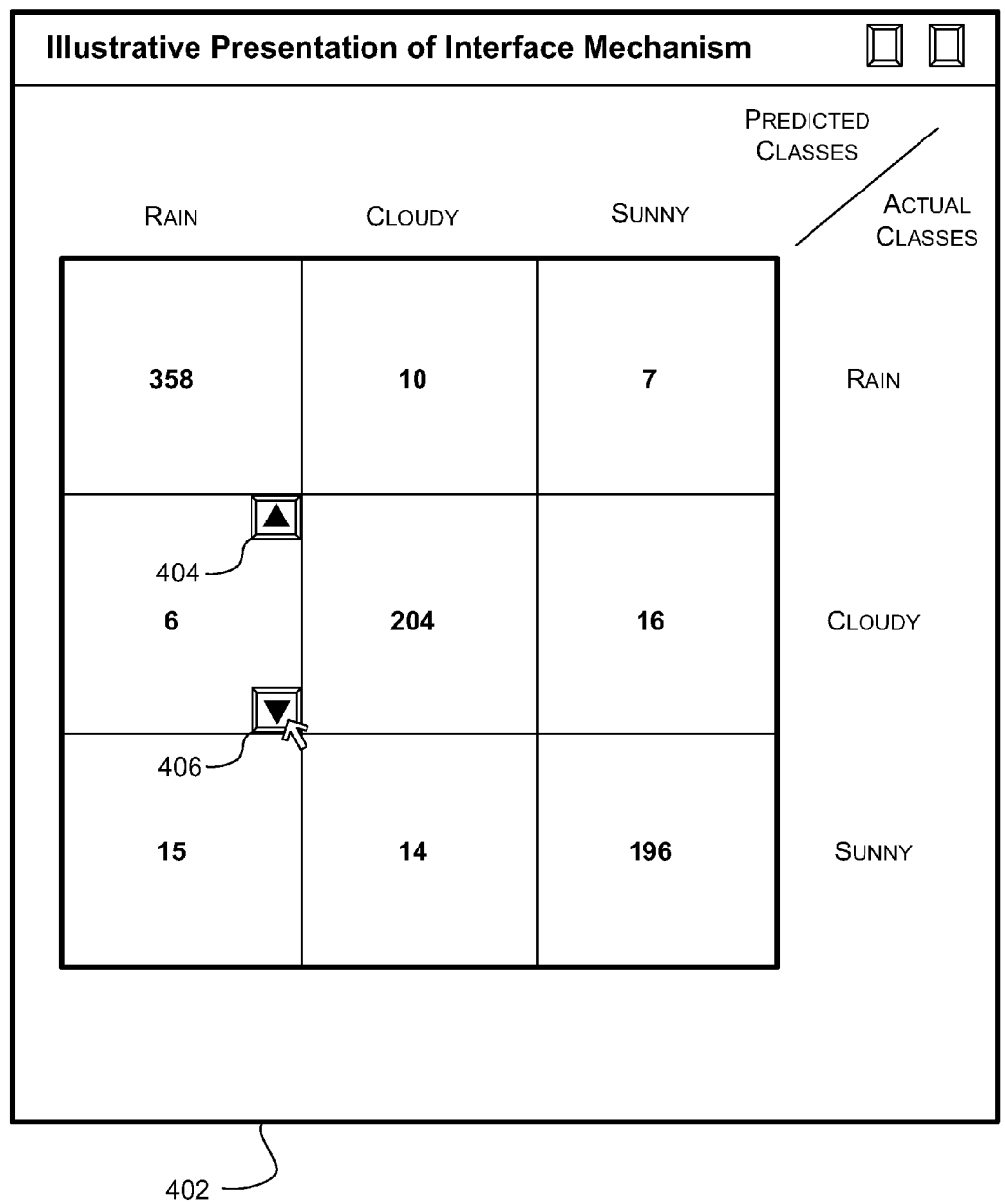

Advancing now to FIG. 4, this figure shows a GUI presentation 402 that the interface mechanism 216 can use to present a confusion matrix (which, to repeat, is one manner of conveying the current state of the classification system 204, but not the only way to convey that information). The confusion matrix shown in FIG. 4 shows the manner in which the classification system 204 classifies data items with respect to three possible classes, e.g., classes of rain, cloudy, and sunny. The row dimension (i) of the confusion matrix indicates the correct classification, while the column dimension (j) of the confusion matrix indicates the assessed classification. Thus, for example, this illustrative confusion matrix indicates that the classification system 204 has classified 6 data items as rain, when the correct classification is cloudy. In the terminology used herein, this value of 6 is referred to as a parameter setting. Collectively, the parameter settings in the confusion matrix convey the current state of the classification system 204.

The user can use the interface mechanism 216 to makes changes to any individual parameter setting. For example, suppose that the user wants to decrease value of the $cell_{21}$ (in row 2 and column 1) from value 6 to value 5. In one merely representative case, the user can move a mouse cursor over that cell, upon which the interface mechanism 216 can display a value-up command 404 and a value-down command 406. The user can click on the value-down command 406 to decrease the value in that cell. The user can "hold down" the value-down command 406 if he or she wants to decrease the value by a larger amount, upon which the interface mechanism 216 will successively decrease the value of that cell.

There are many other techniques that the interface mechanism 216 can use to change the parameter settings. For example, instead of numbers, the interface mechanism 216 can display dots or other indicia within cells to indicate the number of data items that have been classified within those cells. The user can adjust the classification results by using a drag-and-drop procedure to drag some results from one cell and drop them into another cell, which has the effect of reducing the value of one cell and increasing the value of another cell. This approach may be appropriate, for instance, for an image classification system. In this case, each cell can present thumbnails of images that have been categorized into different respective categories. The user can drag and drop the thumbnails from one cell into another to change the classification results for two respective cells.

The change shown in FIG. 4 (decreasing the value of $cell_{21}$) specifies a desired behavior which does not match the current state of the classification system 204. The feature adjustment module 220 is thereby invoked to calculate new cost values in the cost matrix, if feasible (in one example used for explanation purposes). The new cost matrix, in turn, results in a new classification of data items, producing an updated current state.

FIG. 5 shows the updated current state. Note that the value of $cell_{21}$ in the confusion matrix is changed from value 6 to value 5, as instructed by the user. Also note that values of other cells have changed. Namely, the values of some cells have increased, the values of other cells have decreased, and the value of one cell has stayed the same. The interface mechanism 216 can highlight the way in which the confusion matrix has changed in various ways. In one approach, the interface mechanism 216 displays increases and decreases in two different colors. The interface mechanism 216 can convey the magnitude of the changes by modulating the opacities of the color overlays. FIG. 5 represents an increase in value using a first geometrical symbol and a decrease in value using a second geometrical symbol.

The interface mechanism 216 can allow the user to influence changes produced in the confusion matrix in other ways. For example, FIG. 6 shows a scenario in which the user wishes to input a biasing cue with respect to a particular cell, i.e., $cell_{22}$. Here, the user specifies that he or she wants this cell not to decrease in response to a change made to another cell. The interface mechanism 216 can allow the user to set such a biasing cue in various ways, such as by activating a value-up command 602 within $cell_{22}$ while simultaneously pressing a control key (or some other designated key). This has the effect of adding a biasing cue indicator 604 within the $cell_{22}$. The interface mechanism 216 can allow the user to remove this biasing cue indicator 604 (and the resultant biasing cue) by activating an appropriate local cancel command within $cell_{22}$ (not shown). In addition, the interface mechanism 216 can allow the user to remove all such biasing cues by clicking on an appropriate global control command, such as command 606.

Figures 7, 8:
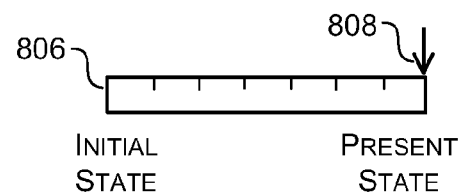

Now assume that, after setting the biasing cue shown in FIG. 6, the user decreases the value in $cell_{21}$ from the value 5 to the value 4. FIG. 7 shows the outcome of this change when the biasing cue remains set for $cell_{22}$, while FIG. 8 shows the result of the this change for the case in which the biasing cue is not set for $cell_{22}$. Note that the change for $cell_{22}$ in FIG. 7 is greater than the change for $cell_{22}$ in FIG. 8. This is because, in FIG. 7, the user has indicated a preference that this cell is not to decrease in value when another cell is changed. Thus, the feature adjustment module 220 may be more apt to increase the value in $cell_{22}$ (in FIG. 7) when a change is made to $cell_{21}$ (compared to the case in FIG. 8).

The user can also provide instructions which specify that the values of one of more cells are dependent on the values of one or more other cells. For example, the user can specify that if $cell_{12}$ increases by x amount, then the value of $cell_{13}$ is to increase by y amount, and so on. In addition, or alternatively, the user can specify that the value(s) of one or more cells are dependent on other factors besides the values in the confusion matrix.

In all of the examples set forth above, it is possible that the feature adjustment module 220 cannot find a solution that satisfies the constraints specified by the user via the interface mechanism 216. For example, the feature adjustment module 220 may not be able to provide a cost matrix that satisfies the changes made to the confusion matrix. In this case, the tool 202 can inform the user that his or her instructions are infeasible, upon which the user has the option of adjusting the confusion matrix in another way.

In one implementation, the changes made via the tool cannot necessarily be reversed by entering subsequent instructions via the interface mechanism 216. For example, if the user enters an instruction to increase the value of a particular cell, this change will have various consequences. If the user then enters an instruction to decrease the value of that same cell, the tool 202 will not necessarily restore the confusion matrix to the same state before the cell was increased. Thus, to achieve such backtracking, the interface mechanism 216 can provide an "undo" command or the like which removes the effects of a particular change. The tool 202 can implement this feature by recording a history of system settings at each point in the user's interaction. The undo command causes the tool 202 to revert to a particular state (and associated system settings) defined in the history. The tool 202 can also provide a "redo" command which reverses the effect of an undo command. FIG. 8 shows an illustrative undo command 802 and a redo command 804.

According to another feature, the tool 202 can provide a history navigation command which allows the user to navigate to different junctures in a sequence of changes that have been made to the system 204. For example, the command can be implemented as a slider mechanism 806 or the like. Different points along a span of the slider mechanism 806 represent different respective system settings associated with respective prior states. When the user moves a slider indicator 808 to a point along the span, the tool 202 restores the system settings associated with that point and displays the confusion matrix associated with those system settings. Further, upon making such a change, the selected prior state becomes the new current state.

In one case, the above-described adjustment of cost values (via the confusion matrix) can be performed as part of the initial training of the classification model 210. Alternatively, or in addition, the user can perform the adjustment of cost values after the classification model 210 has been trained and placed in use.

In one case, the classification system 204 can produce a single cost matrix for use by all users. In another case, the classification system 204 can allow different users to establish different respective cost matrices, e.g., to accommodate the individual preferences of the respective users.

In some cases, the feature adjustment module 220 can control a single aspect of the classification system 204. For example, the feature adjustment module 220 can control the decision module 214 by supplying cost values to this component. In this case, the feature adjustment module 220 can supply a single cost matrix for use by the single component. In another case, the feature adjustment module 220 can control two or more different aspects of the classification system 204, such as the likelihood assessment module 212 and the decision module 214. In that case, the feature adjustment module 220 can supply a single cost matrix for jointly controlling two or more components of the classification system 204; or the feature adjustment module 220 can supply two or more cost matrices for controlling two or more respective components of the classification system 204.

In general, the tool 202 can provide updated current states (and resultant confusion matrices) sufficiently quickly to achieve the perception of real time interaction. That is, upon making a change, the user can receive a new confusion matrix relatively quickly, where that new confusion matrix shows the results of the change. This provides good user experience by helping the user understand the nexus between changes made to the classification system 204 and the resultant consequences of those changes. This manner of interaction also readily facilitates a "what-if" manner of making changes to the classification system 204.

The ability to make changes directly to the confusion matrix also contributes to good user experience. That is, the user can readily understand the meaning of changes made to the confusion matrix, because the confusion matrix directly represents the output of the classification system 204. Complex considerations may go into the computation of an updated cost matrix, yet the tool 202 effectively shields the user from the responsibility of directly controlling the underlying changes; that is, the user achieves these underlying changes in indirect fashion by interacting with the confusion matrix.

B. Illustrative Processes

FIGS. 9-12 show procedures that explain one manner of operation of the tools (102, 202) of FIGS. 1 and 2. Since the principles underlying the operation of these tools (102, 202) have already been described in Section A, some operations will be addressed in summary fashion in this section.

Figure 9:
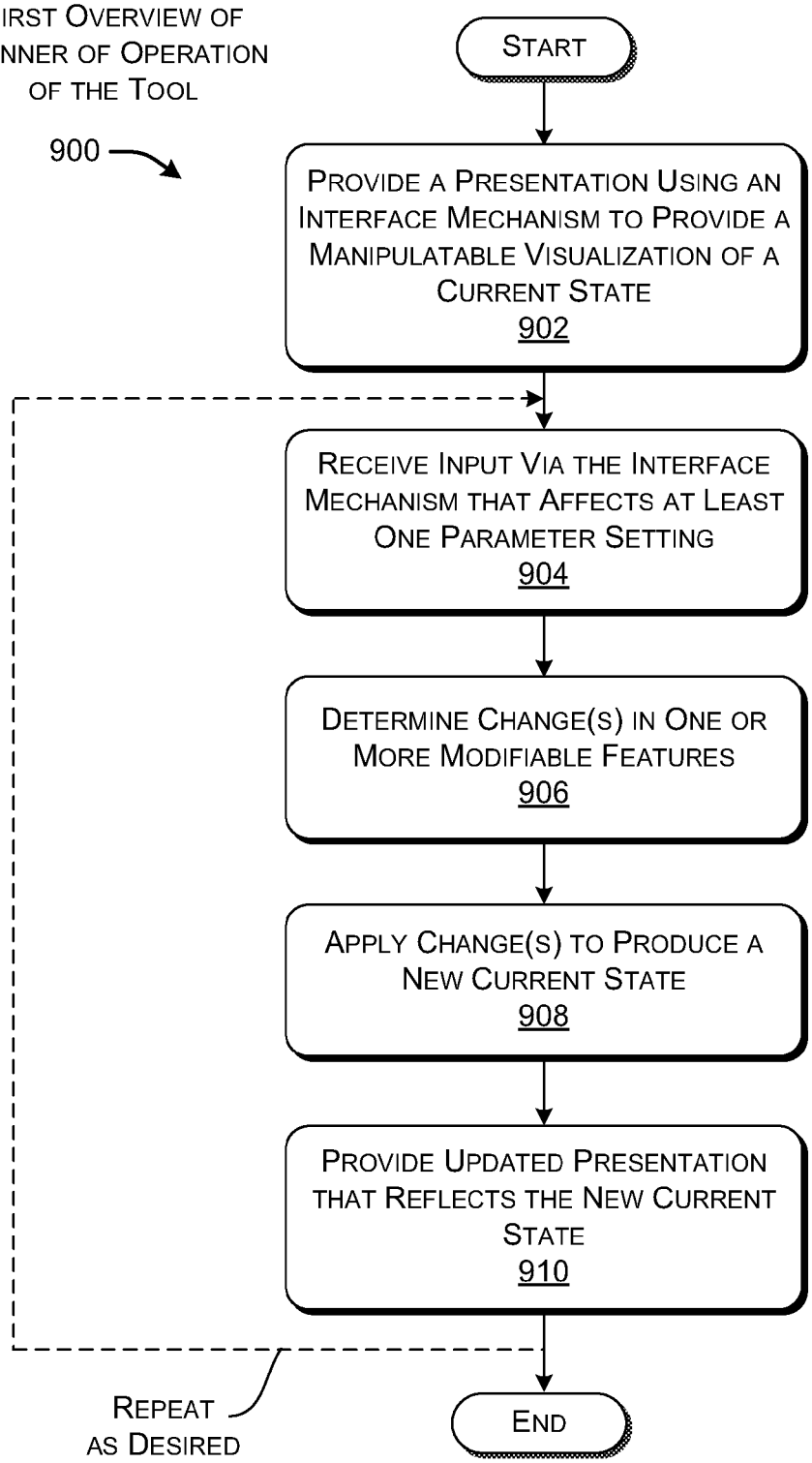
FIG. 9 shows an illustrative procedure for changing the behavior of the system in the general environment of FIG. 1.

Starting with FIG. 9, this figure shows a procedure 900 that provides a first overview of the manner of operation of the tools (102, 202). The procedure 900 will be explained in the context of the functionality shown in FIG. 1.

In block 902, the tool 102 provides a presentation 112 using an interface mechanism 108. The presentation 112 includes a plurality of parameter settings that collectively provides a manipulatable visualization of a current global state of the system 104.

In block 904, the tool 102 receives, via the interface mechanism 108, input from a user that affects at least one of the parameter settings.

In block 906, the tool 102 then determines changes in at least one modifiable feature of the system 104 based on the input from the user, providing that the changes are feasible.

In block 908, the tool 102 then applies the changes to the system 104 to produce a new current global state. The new current global state reflects a global implications of the input from the user.

In block 910, the tool 102 then provides an updated presentation that provides a manipulatable visualization of the new current global state, the updated presentation providing feedback to the user regarding an effect of the input, thus facilitating real time interaction.

Figure 10:
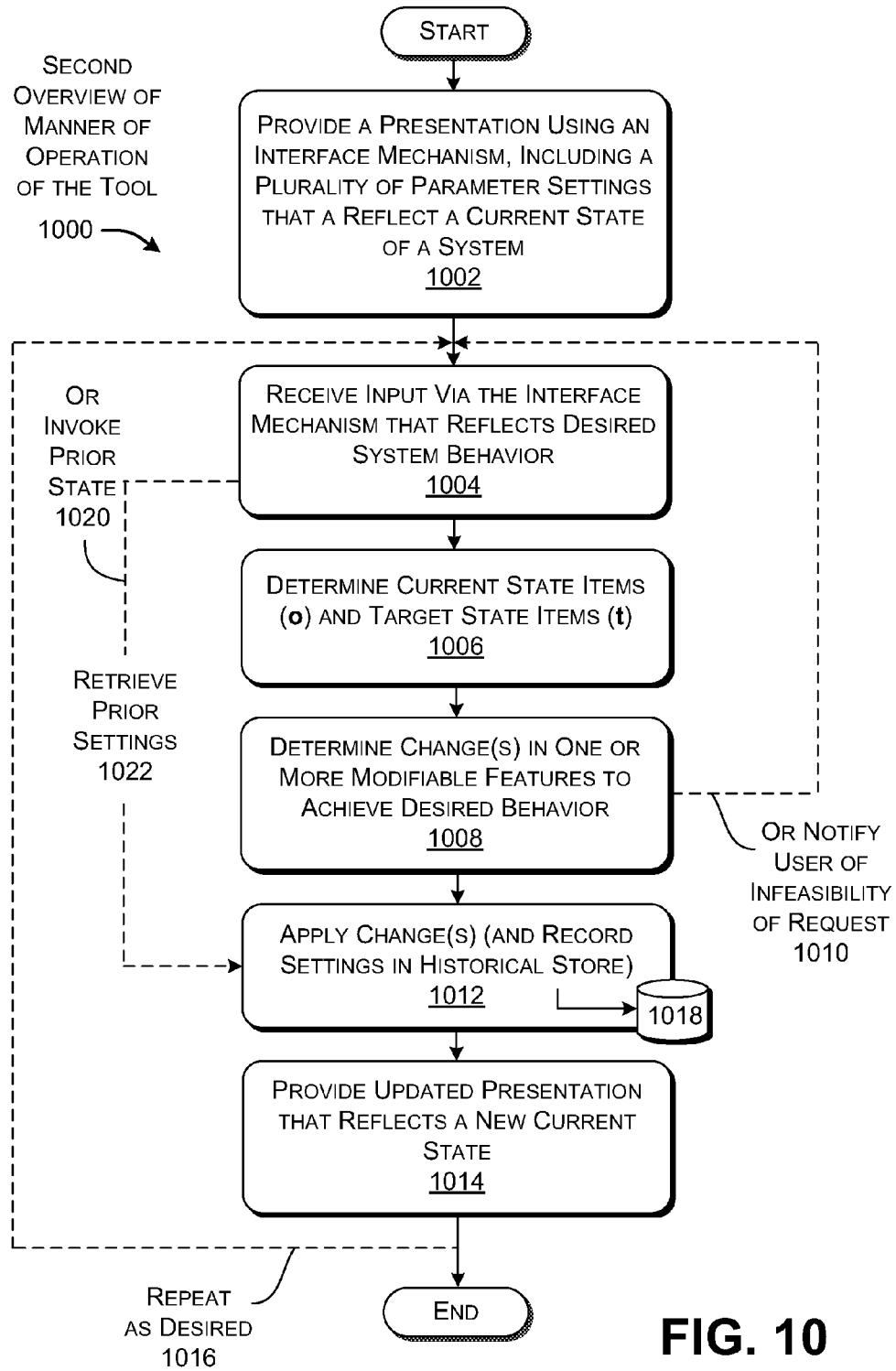
FIG. 10 shows another illustrative procedure for changing the behavior of the system in the general environment of FIG. 1.

FIG. 10 shows a procedure 1000 that provides a second overview of the manner of operation of the tools (102, 202). The procedure 1000 will be explained in the context of the functionality shown in FIG. 1.

In block 1002, the tool 102 provides the presentation 112 using the interface mechanism 108. The presentation 112 can be implemented (in one example) as a GUI presentation that presents a plurality of parameter settings. The parameter settings may correspond to classification result values in a confusion matrix or the like.

In block 1004, the interface mechanism 108 receives input from the user that reflects a desired system behavior. The user can enter such an instruction in any manner, such as via any of the illustrative techniques shown in FIGS. 4-8.

Figure 11:
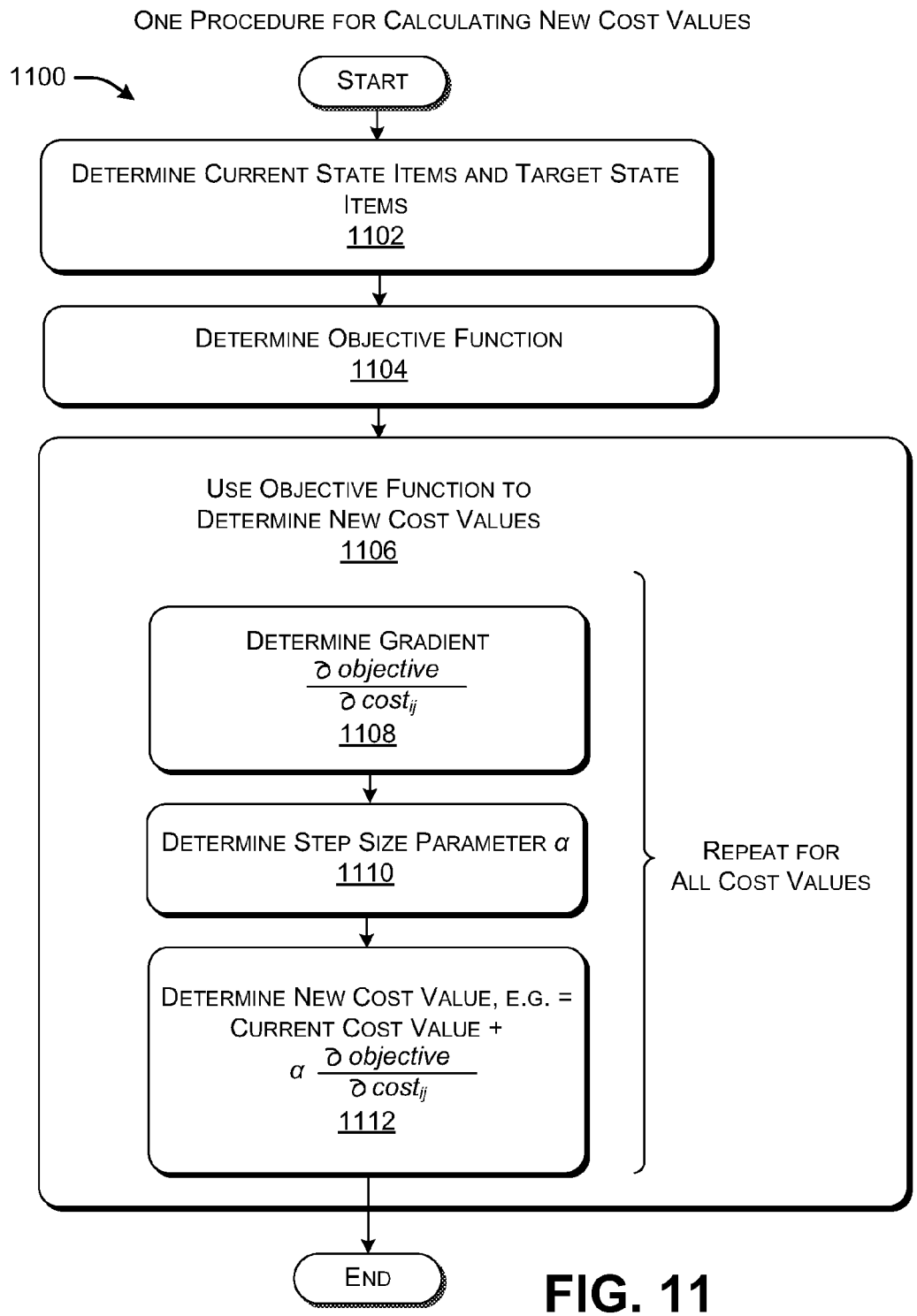
FIG. 11 shows an illustrative procedure for calculating new cost values, in the context of the environment of FIG. 2.

In block 1006, the feature adjustment module 110 determines a plurality of current state items (o) (e.g., vectors) that represent the current state of the system 104 and a plurality of target state items (t) (e.g., vectors) that represent the desired behavior of the system. FIG. 11 will be used to elaborate on one possible implementation of this operation.

In block 1008, the feature adjustment module 110 determines a change in one or more modifiable features (such as cost values) that will move the system 104 from its current state to the desired behavior, based on the current state items and the target state items. FIG. 11 will be used to elaborate on one possible implementation of this operation.

Alternatively, as indicated by dashed line 1010, the tool 102 can determine that the desired behavior requested by the user is infeasible. If so, the tool 102 can notify the user of this conclusion and give the user the opportunity to specify a new desired behavior.

In block 1012, if feasible, the feature adjustment module 110 applies the change (computed in block 1008) to the system 104, such as by changing the cost values and/or making other appropriate changes.

In block 1014, the interface mechanism 108 displays an updated presentation 112 that reflects a new current state produced by the changes made in block 1010. The update in block 1014 can be provided relatively quickly after the user provides an instruction in block 1004, thus facilitating real time interaction. A dashed line 1016 indicates that the above procedure can be repeated any number of times until the user is satisfied that the current state adequately matches the desired behavior.

Blocks 1008 and 1012 also encompass storing system settings associated with each state achieved by the system 104 (denoted in FIG. 10 by an arrow pointing to a store 1018). The tool 102 then allows a user to return to a prior state of the system 104 upon selection of that prior state. As described in connection with FIG. 8, the user can select a prior state of the system 104 using one or more of: an undo command; a redo command; a history navigation mechanism (such as a slider mechanism), and so on. In the context of FIG. 10, this mode of operation can be conceptualized as dashed line 1020. This mode of operation comprises: (a) in block 1004, receiving the user's selection of a non-current state through any mechanism; (b) in operation 1022, retrieving corresponding system settings from the store 1018; and (c) in block 1012, applying the retrieved settings to duplicate the selected non-current state.

FIG. 11 shows a procedure 1100 that elaborates on the manner in which the feature adjustment modules (110, 220) operate (for the case in which a feasible desired behavior is specified by the user), according to one implementation. This figure will be explained in the representative context of the tool 202 of FIG. 2, in which the tool 202 computes new cost values based on the user's interaction with a confusion matrix.

In block 1102, the feature adjustment module 220 determines a plurality of current state items o for data items in a test set and a plurality of target state items t for data items in the test set. A current state item o for a particular data item can be formed as a vector, given by:

$$o = \frac{[\exp(-risk^1), \ldots, \exp(-risk^c)]}{\sum_{i=1}^{c}(-risk^i)}.$$

Here, $risk^j$ is the risk of classifying the data item as class j, as given above, and c refers to the number of possible classes. Note that $\exp(\bullet)$ is a monotonically increasing function; thus, the vector o for a data item is a normalized representation in which a high value corresponds to a class with low risk. At the outset, the cost matrix can be initialized so that it includes the value zero for diagonal elements and the value one elsewhere.

The target state item t for each data item represents the ideal state given the desired behavior. That is, in the absence of interaction, the target state items match the corresponding original state items. However, if the user seeks another state, the inputs provided by the user (via the interface mechanism 216) convey divergent target state items. Like the current state items, each of the target state items can be expressed as a vector.

Consider, for example, the case in which the user presses an up-value command for a particular $cell_{ij}$ in the confusion matrix (e.g., via the up-value command shown 404 in FIG. 4), or biases the $cell_{ij}$ in the up direction (via the provisions shown in FIG. 6). In this case, the tool 202 will attempt to make it such that the data items with true class i are classified as class j. This implies that $risk^j$ for all those data items will be at a minimum. Consequently, the target state item t for such a data item is assigned zeros everywhere except the $j^{th}$ dimension, which is set to one.

Consider next the case in which the user presses a value-down command for the $cell_{ij}$ in the confusion matrix (e.g., via the value-down command 406 in FIG. 4) or biases the $cell_{ij}$ in the down direction (via the provisions of FIG. 6). The tool 202 will then attempt to reach a confusion matrix in which $risk^j$ is not minimum. Consequently, for each affected data item, the target state item t will be set equal to the current state item o, except for the $j^{th}$ dimension, which is set to zero.

Some data items will be unaffected by the user's interaction. For those data items, the feature adjustment module 220 sets the target state item t equal to the original state item o. This helps regularize the problem by implying that a configuration is sought that satisfies the user's preference, but is otherwise closest to the original state.

In block 1104, the feature adjustment module 110 computes a model which characterizes a manner of change of the system 204, such as an objective function. Generally, the objective function reflects how well a current cost matrix satisfies the user's intentions expressed by the user's instructions to the interface mechanism 216. More specifically, the objective function expresses the difference between the current state items o and the target state items t. The goal is to change the cost values such that the value of the objective function moves in a desired direction (e.g., increases in value).

In one case, an objective function, objective, is given by a sum of a fitness functions, fitness, over all the N data items in the test set:

$$\text{objective} = \sum_{N=1}^{N} \text{fitness}(t^n, o^n).$$

The fitness function, in turn, measures how well a particular data item aligns with the user's preferences. That is, the fitness function measures how "near" the current state item o is to the target state item t for a data item. The nearness property can be computed in various ways, such by using the KL-divergence technique. Formally, the fitness function for a particular data item can be expressed as:

$$\text{fitness}(t, o) = \sum_{i=1}^{c} -t_i \log \frac{t_i}{o_i}.$$

Note that the maximum value attained by the fitness function is zero and is achieved when the current state item o is the same as the target state item t. In all other cases, the fitness function results in a negative value.

In block 1106, the feature adjustment module 220 uses the objective function provided in block 1104 to determine new cost values. Block 1106, in turn, includes (or can be conceptualized to include) plural component operations. The component operations are described below with respect to a single cost value, but the explanation applies to the cost matrix as a whole.

In block 1108, for each cost value $cost_{ij}$ in the cost matrix, the feature adjustment module 220 computes a gradient of the objective function with respect to the $cost_{ij}$. One way that the gradient can be computed is as follows:

$$\frac{\partial \text{objective}}{\partial cost_{ij}} = \sum_{n=1}^{N} p_i^n \cdot o_j^n \left[ \left( \sum_{i'=1}^{c} t_{i'}^n \right) - 1 \right].$$

Here, $p_i^n$ is the likelihood for a class i for a particular data item n, $o_j^n$ is a current state item component for class j for the data item n, and $t_i^n$ is a target state item component for class for a data item n.

In block 1110, the feature adjustment module 220 determines a step size parameter α. The step size parameter influences the magnitude of change in a particular direction defined by the gradient (as determined in block 1008). In one approach, the feature adjustment module 220 uses a binary search technique in order to determine the step size parameter such that a number in a particular cell in which the user presses the value-down command or the value-up command decrements or increments by one, respectively. In one implementation, the search for the step size parameter only considers the strong constraints (associated with express value changes) and not the biasing cues. In contrast, both the strong constraints and biasing cues are used to determine the direction of change in block 1108. The product of a step size parameter and a gradient determines a change amount for a particular cost value in a particular direction (defined by the gradient).

Finally, in block 1112, the feature adjustment module 220 computes a new cost value based on the computations in blocks 1108 and 1110. The new cost value can be given by:

$$cost_{ij}^{new} = cost_{ij} + \alpha \cdot \frac{\partial \text{objective}}{\partial cost_{ij}}.$$

The feature adjustment module 220 repeats the same procedure described in blocks 1108-1112 with respect to each cost value in the cost matrix.

Figure 12:
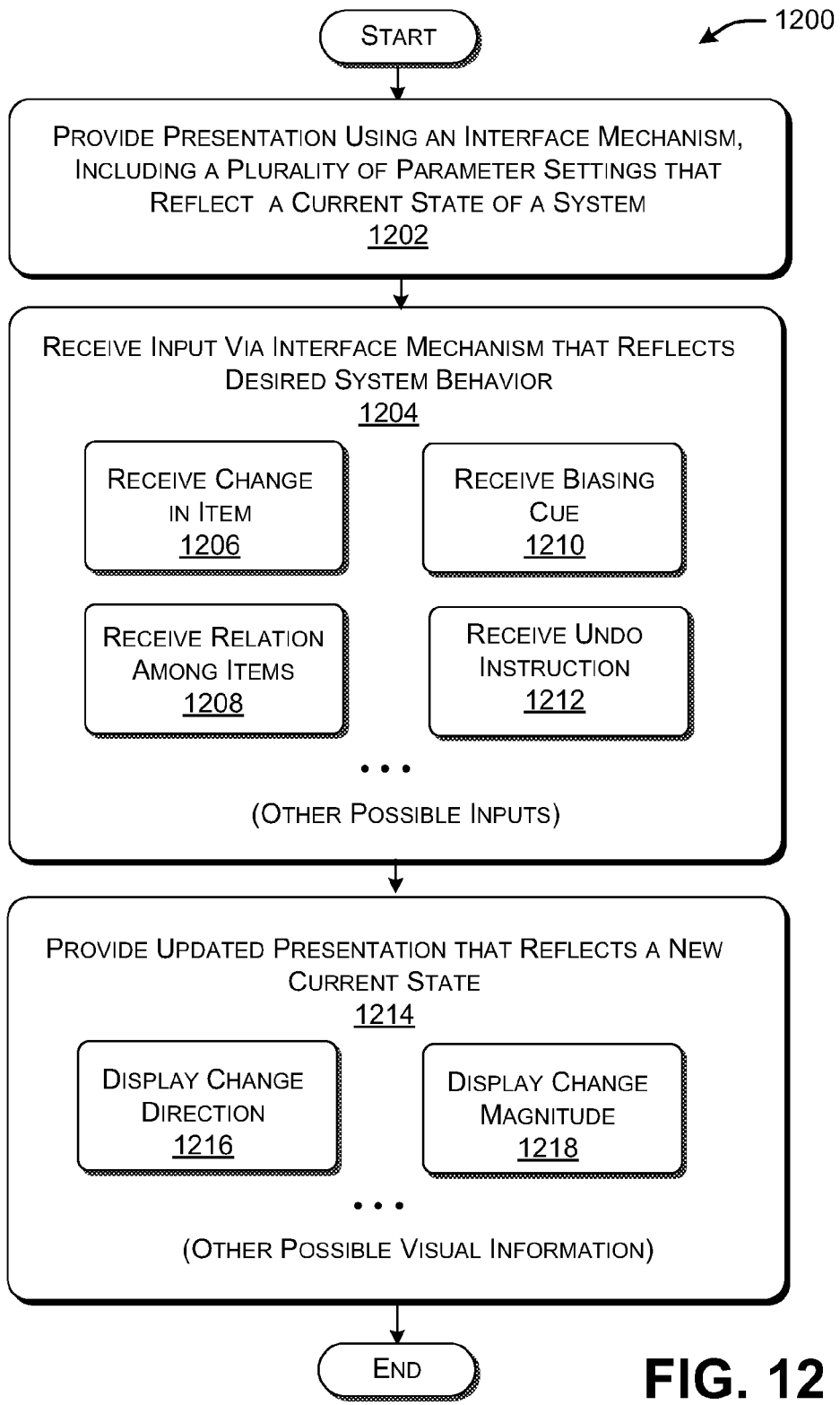
FIG. 12 shows an illustrative procedure by which a user can interact with the user interface presentations of FIGS. 4-8.

FIG. 12 shows a procedure 1200 which summarizes one manner in which the interface mechanism 216 (of FIG. 2) can interact with the user. This procedure 1200 is representative, rather than exhaustive; other implementations of the interface mechanism 216 can adopt other techniques for interacting with the user.

In block 1202, the interface mechanism 216 provides a presentation that includes a plurality of parameter settings that reflect a current state of the classification system 204. For example, in the context of FIG. 2, the interface mechanism 216 can display a confusion matrix that includes a plurality of classification results.

In block 1204, the interface mechanism 216 can receive input from the user. The interface mechanism 216 can provide various mechanisms for receiving input. Block 1206 indicates that the interface mechanism 216 can receive an instruction to increase or decrease the value in a particular cell. Block 1208 indicates that the interface mechanism 216 can receive an instruction to change the value in a particular cell as a function of the value in some other cell(s) and/or as a function of some other factor(s). Block 1210 indicates that the interface mechanism 216 can receive an instruction to bias the value in a particular cell either up or down (as illustrated in FIGS. 6-8). Block 1212 indicates that the interface mechanism 216 can "undo" the changes made in block 1204 to restore the confusion matrix to a point before the changes were made. The user can also activate a "redo" command to remove the effects of the "undo" command. The user can also use a slider mechanism to select from among a series of prior states (and associated system settings). The changes in block 1204 can encompass yet other types of instructions.

In block 1214, if the change requested by the user is feasible, the interface mechanism 216 displays a new presentation that reflects a new current state (produced as a consequence of the input received in block 1204). Block 1216 indicates that the interface mechanism 216 can use visual information to highlight the direction in which cell values have changed relative to a previous state. Block 1218 indicates that the interface mechanism 216 can use visual information to highlight the magnitude of change in a particular cell. The visual information presented in block 1214 can encompass yet other types of highlighting. The visual information is supplemental to the display of a numerical value associated with a cell.

C. Representative Processing Functionality

FIG. 13 sets forth illustrative physical (e.g., electrical) computing functionality ("computing functionality") 1300 that can be used to implement any aspect of the functions described above. With reference to FIGS. 1 and 2, for instance, the type of computing functionality 1300 shown in FIG. 13 can be used to implement any aspect of the tools (102, 202) and/or the systems (104, 204), etc. In one case, the computing functionality 1300 may correspond to any type of computing device that includes one or more processing devices.

The computing functionality 1300 can include volatile and non-volatile memory, such as RAM 1302 and ROM 1304, as well as one or more processing devices 1306. The computing functionality 1300 also optionally includes various media devices 1308, such as a hard disk module, an optical disk module, and so forth. The computing functionality 1300 can perform various operations identified above when the processing device(s) 1306 executes instructions that are maintained by memory (e.g., RAM 1302, ROM 1304, or elsewhere). More generally, instructions and other information can be stored on any computer readable medium 1310, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The computing functionality 1300 also includes an input/output module 1312 for receiving various inputs from a user (via input modules 1314), and for providing various outputs to the user (via output modules). One particular output mechanism may include a presentation module 1316 and an associated graphical user interface (GUI) 1318. The computing functionality 1300 can also include one or more network interfaces 1320 for exchanging data with other devices via one or more communication conduits 1322. One or more communication buses 1324 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented using computing functionality, for modifying behavior of a classification system that performs mathematical analysis, comprising:
    providing a presentation using an interface mechanism, the presentation including a plurality of parameter settings that collectively provides a manipulatable visualization of a current global state of the classification system, the classification system including a likelihood assessment module for assessing probabilities that a data item corresponds to different respective classes;
    receiving, via the interface mechanism, input from a user that affects at least one of the parameter settings;
    determining at least one change in at least one modifiable feature of the system based on the input from the user;
    determining whether the at least one change is feasible;
    applying said at least one change to the system to produce a new current global state if the at least one change is determined to be feasible; and
    providing an updated presentation that provides a manipulatable visualization of the new current global state, the updated presentation providing feedback to the user regarding an effect of the input.

2. The method of claim 1, wherein the system corresponds to a classification system.

3. The method of claim 2, wherein the classification system further comprises a decision module for determining an action to take based on the probabilities assessed by the likelihood assessment module.

4. The method of claim 3, wherein said at least one modifiable feature corresponds to a plurality of cost values that define decision boundaries that the decision module uses to classify data items.

5. The method of claim 3, wherein said at least one modifiable feature affects a manner of operation of at least one of: the likelihood assessment module or a training module used to create the likelihood assessment module.

6. The method of claim 2, wherein the plurality of parameter settings conveys classification results produced by the classification system for a plurality of data items.

7. The method of claim 6, wherein the input comprises an instruction to change a parameter setting.

8. The method of claim 6, wherein the input comprises an instruction to constrain change in a parameter setting, as per a biasing cue.

9. The method of claim 1, further comprising storing system settings associated with at least one prior state of the system, and allowing the user to return to a prior state of the system upon selection of the prior state.

10. The method of claim 9, wherein the user selects the prior state of the system using one or more of:
    an undo command;
    a redo command; or
    a history navigation mechanism.

11. A computer readable storage medium for storing computer readable instructions, the computer readable instructions providing a user mechanism that allows a user to modify behavior of a classification system, the computer readable instructions comprising:
    logic configured to provide a presentation, the presentation including a plurality of parameter settings that convey classification results produced by the classification system for a current state of the classification system, the classification results identifying instances of correct classification and incorrect classification;
    logic configured to receive input from a user that affects a value of at least one parameter setting, the input conveying a behavior of the classification system; and
    logic configured to present an updated presentation that reflects a new current state, the new current state being produced, if feasible, by changing at least one modifiable feature of the system that corresponds to a plurality of cost values that define decision boundaries that are used to classify data items based on the input received from the user, the updated presentation providing feedback to the user regarding an effect of the input.

12. The computer readable storage medium of claim 11, wherein the input comprises an instruction to constrain change in a parameter setting.

13. The computer readable storage medium of claim 11, wherein at least one parameter setting in the updated presentation includes visual information which conveys a manner in which said at least one parameter setting has changed, the visual information being supplemental to a presentation of a current value of said at least one parameter setting.

14. The computer readable storage medium of claim 13, wherein the visual information conveys at least one of:
- a magnitude of change to said at least one parameter setting; or
- a direction of change to said at least one parameter setting.

15. A method comprising:
- providing a presentation using an interface mechanism including a plurality of parameter settings that reflect a current state of a system;
- receiving input from a user via the interface mechanism of a desired behavior of the system, the input comprising an instruction to constrain change in a parameter setting;
- determining a plurality of current state items that represent the current state of the system and a plurality of target state items that represent the desired behavior of the system;
- analyzing the current state items and the target state items to determine one or more changes to one or more modifiable features of the system to transform the system from the current state to the desired behavior;
- determining whether the one or more changes are feasible; and
- applying the one or more changes to the system if the one or more changes are determined to be feasible.

16. The method of claim 15, further comprising providing an updated presentation via the interface mechanism that reflects a new current state of the system after the one or more changes have been applied.

17. The method of claim 15, further comprising notifying the user of the infeasibility of the desired behavior if the one or more changes are determined to be infeasible and giving the user an opportunity to specify a new desired behavior.

18. The method of claim 15, wherein analyzing the current state items and the target state items to determine one or more changes to one or more modifiable features of the system comprises using an objective function to reflect the difference between the current state items and the target state items.

19. The method of claim 15, wherein the system is a classification system.

20. The method of claim 15, wherein providing a presentation using the interface mechanism comprises displaying via the interface mechanism a confusion matrix that includes a plurality of classification results.

* * * * *